United States Patent

Coloma Calahorra et al.

(10) Patent No.: US 8,638,579 B2
(45) Date of Patent: Jan. 28, 2014

(54) METHOD FOR CONTROLLING A CONVERSION STRUCTURE FOR CONVERTING DIRECT CURRENT TO ALTERNATING CURRENT

(75) Inventors: Javier Coloma Calahorra, Sarriguren (ES); Roberto González Senosian, Sarriguren (ES); Francisco Javier Ancín Jiménez, Sarriguren (ES); Luis Marroyo Palomo, Sarriguren (ES)

(73) Assignee: Ingeteam Power Technology, S.A., Bizkaia (ES)

( * ) Notice: Subject to any disclaimer, the term of this patent is extended or adjusted under 35 U.S.C. 154(b) by 495 days.

(21) Appl. No.: 12/996,815

(22) PCT Filed: Jun. 17, 2008

(86) PCT No.: PCT/ES2008/000432
§ 371 (c)(1),
(2), (4) Date: Jan. 10, 2011

(87) PCT Pub. No.: WO2009/153360
PCT Pub. Date: Dec. 23, 2009

(65) Prior Publication Data
US 2011/0170326 A1    Jul. 14, 2011

(51) Int. Cl.
*H02M 3/24* (2006.01)
*H02M 7/5387* (2007.01)

(52) U.S. Cl.
USPC .......................................... 363/98; 363/132

(58) Field of Classification Search
USPC ............... 363/56.01, 56.02, 97, 98, 131, 132
See application file for complete search history.

(56) References Cited

U.S. PATENT DOCUMENTS

| | | | |
|---|---|---|---|
| 4,482,946 A | 11/1984 | Bhagwat | |
| 6,021,052 A * | 2/2000 | Unger et al. | 363/26 |
| 7,099,169 B2 * | 8/2006 | West et al. | 363/132 |
| 2012/0290145 A1 * | 11/2012 | Joshi et al. | 700/298 |

OTHER PUBLICATIONS

International Search Report issued Mar. 12, 2009 in International (PCT) Application No. PCT/ES2008/000432.
Y. Nishida et al., "A Novel Type of Utility-Interactive Inverter for Photovoltaic System," Power Electronics and Motion Control Conference, 2004. Conference Proceedings. IPEMC 2004. The 4$^{th}$ International Xi'an, China, Aug. 14-16, 2004, vol. 3 pp. 1785-1790.
G. Joos et al., "A Three Phase Model Reference Adaptive PWM Techique With Improved Features," Conference Record of the Industry Applications Society Annual Meeting, Seattle, Oct. 7-12, 1990, New York, pp. 997-1004.
S. Kouro et al., "Reduced Switching-Frequency-Modulation Algorithm for High-Power Multilevel Inverters," IEEE Transactions on Industrial Electronics, Piscataway, NJ, USA, vol. 54, No. 5, pp. 2894-2901, Oct. 2007.
Y. Nishida et al., "Integrated Power Converter for Photovoltaic and Fuel Cell Systems in Home," Pub-Power Electronics and Motion Control Conference, Sep. 1, 2008, pp. 2530-2537.

* cited by examiner

*Primary Examiner* — Matthew Nguyen
(74) *Attorney, Agent, or Firm* — Sughrue Mion, PLLC (57) ABSTRACT

The invention relates to a control method applicable to structures for converting direct current/alternating current, dc/ac, especially for photovoltaic systems. The control method according to the invention enables the switching losses of the semiconductors to be reduced, thereby improving the efficiency of the conversion structure. The invention can also be applied to other fields of energy, such as the generation of energy by means of electrochemical cells or wind energy.

19 Claims, 7 Drawing Sheets

METHOD FOR CONTROLLING A CONVERSION STRUCTURE FOR CONVERTING DIRECT CURRENT TO ALTERNATING CURRENT

OBJECT OF THE INVENTION

The invention provides a control method applicable to DC/AC (direct current/alternating current) conversion structures, specially designed for photovoltaic systems, aimed at enhancing conversion structure efficiency. The invention can also be applicable to other fields of energy generation, such as energy generation by means of electrochemical cells or wind energy.

BACKGROUND OF THE INVENTION

At present, photovoltaic systems are widely acknowledged in our society. They are facilities formed by a set of photovoltaic panels (photovoltaic field) and an electronic converter that transforms the energy produced by the panels for injection into the electricity grid or load feeding, depending on whether they are grid-connected facilities or isolated systems.

Figure 1:
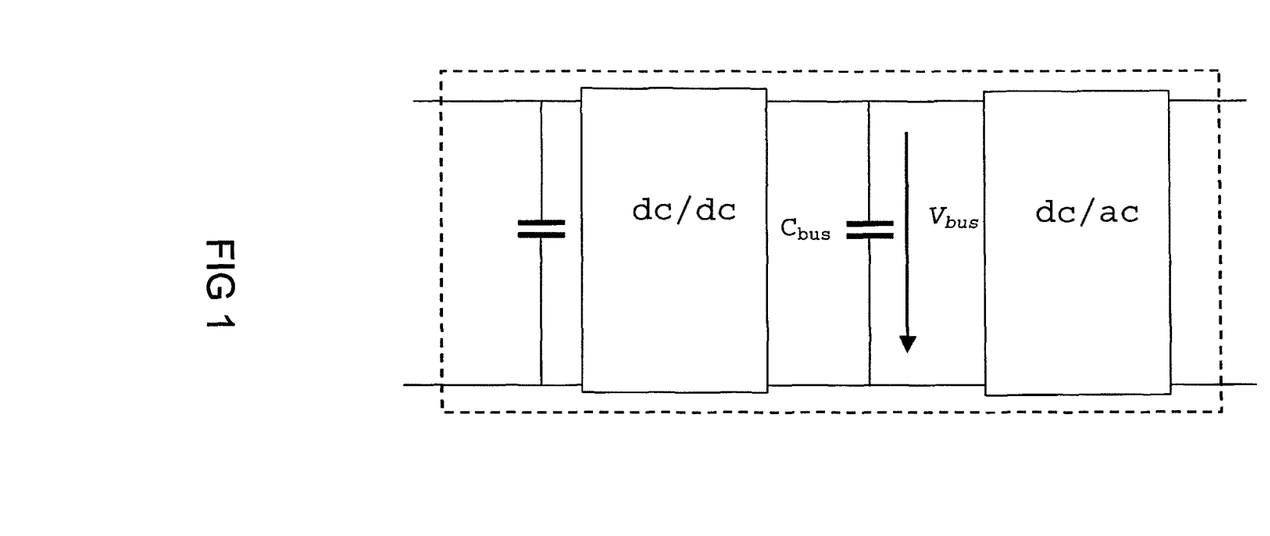
FIG. 1 shows a schematic view of a general state-of-the-art photovoltaic converter.

The different photovoltaic panels available in the market and the specific characteristics of each facility imply that, for the same power output, the resulting photovoltaic field will have very different voltage values. For this reason, the use of converters having a wide input voltage range is interesting. Due to the step-down nature of DC/AC structures, one or several DC/DC step-up stages are normally included at the entrance to photovoltaic converters. FIG. 1 shows a schematic view of a photovoltaic converter formed by the union between a DC/DC stage and a DC/AC stage. A capacity ($C_{bus}$) is disposed between the two stages in the so-called continuous bus for the purpose of stabilising DC/DC stage output voltage. Said voltage is called bus voltage ($V_{bus}$).

Both the DC/DC stage and DC/AC stage are controlled by control loops that vary in function between isolated facilities or grid-connected facilities:
  In grid-connected facilities, the DC/DC stage controls converter input voltage in order to extract the maximum power output from the photovoltaic field, while the DC/AC stage regulates bus voltage by controlling the amplitude of the current injected into the grid.
  In isolated facilities, the DC/DC stage regulates bus voltage and the DC/AC stage is in charge of controlling the output voltage fed by the converter to the loads.
  In both cases, the respective control loops will determine the instructions introduced into the modulator of each stage to establish the power on/power off orders of the different transistors that constitute the stage. The modulators used are normally of the PWM (Pulse Width Modulation) or vector type.

Figure 2:
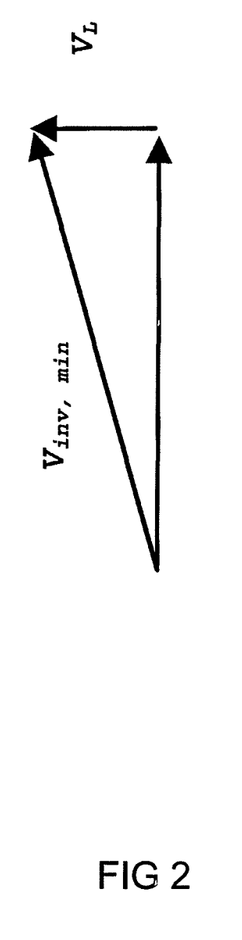
FIG. 2 shows the relationship between the voltage applied by the DC/AC inverter output stage ($V_{inv,min}$), the grid voltaje peak value ($\hat{V}_{grid}$) and voltage dip during converter inductance ($V_L$).
Figure 3:
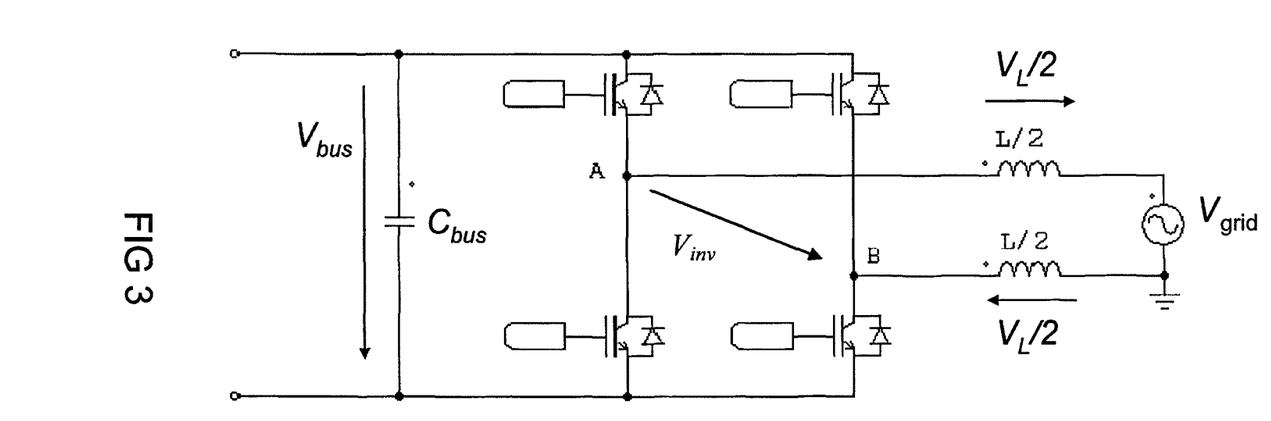
FIG. 3 shows a state-of-the-art H-bridge DC/AC inverter stage.

The bus voltage value required is determined by: the type of DC/AC conversion structure used, grid voltage value or sinusoidal voltage in the case of isolated systems and voltage dip during converter inductance. In order to ensure proper functioning, the minimum voltage applied by the DC/AC inverter output stage ($V_{inv,min}$) must be greater than the sum of the grid voltage peak value (or sinusoidal output voltage in isolated systems) ($\hat{V}_{grid}$) and voltage dip during converter inductance ($V_L$), as shown in FIG. 2. The voltage applied at the DC/AC output stage depends on the topology used. Thus, for example, for an H-bridge DC/AC stage (FIG. 3), the voltage applied by the DC/AC stage coincides with the bus voltage. In this case:

$$V_{busref,min} = V_{inv,min} = \sqrt{\hat{V}_{grid}^2 + V_L^2}$$

In general, the minimum reference bus voltage ($V_{busref,min}$) can be expressed as:

$$V_{busref,min} = K \cdot \sqrt{\hat{V}_{grid}^2 + V_L^2}$$

where K is a constant that depends on the conversion topology used. Thus, for H-bridge type DC/AC stages K=1 and for half-bridge DC/AC stages K=2.

In the case of grid-connected facilities, effective grid voltage value variation over time gives rise to two options for determining the bus voltage reference value:
1. Using a constant value, calculated based on the peak value of the maximum acceptable grid voltage ($\hat{V}_{grid,max}$).

$$V_{busref,min} = K \cdot \sqrt{\hat{V}_{grid,max}^2 + V_L^2}$$

2. Varying the bus voltage reference value in accordance with the grid voltage peak value at a given time.

$$V_{busref,min} = K \cdot \sqrt{\hat{V}_{grid}^2 + V_L^2}$$

In this last technique of the state of the art, bus voltage drops when working with low grid voltages, thereby reducing semiconductor switching loss.

In the state of the art, the bus voltage reference value normally increases with respect to the minimum value indicated in the preceding cases. Thus, leeway is allowed during possible transitories, while simultaneously enhancing grid injection current quality. Grid injection current quality is evaluated based on THD (Total Harmonic Distorsion), a factor that measures harmonic amplitude with respect to the fundamental harmonic.

$$THD = \frac{\sqrt{I_2^2 + I_3^2 + I_4^2 + I_5^2 + \ldots}}{I_1} \cdot 100$$

Figure 4:
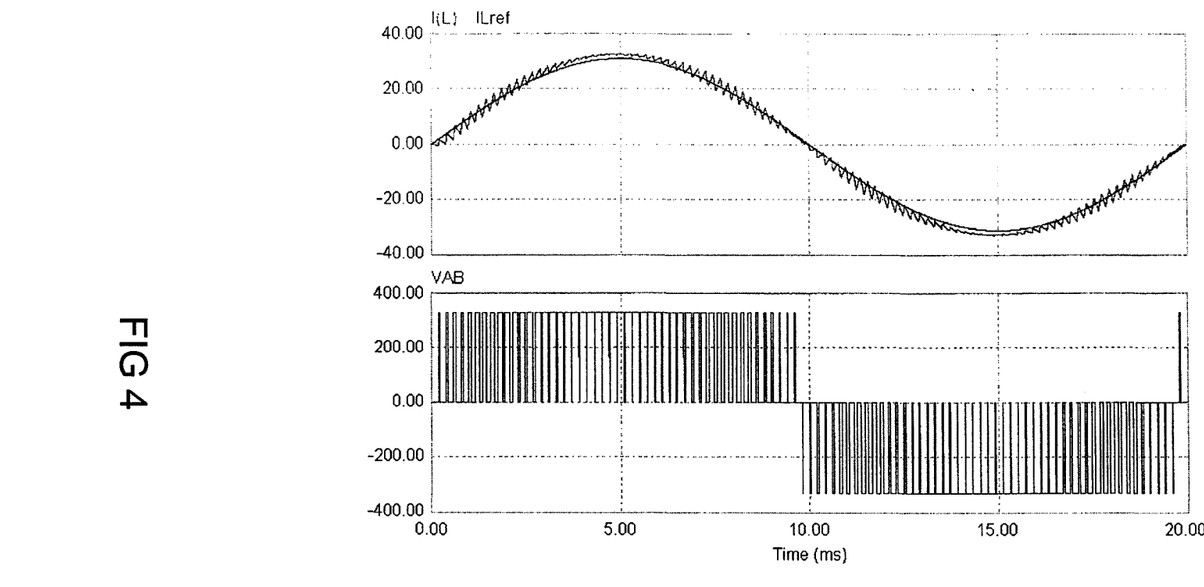
FIG. 4 shows the evolution of the coil current and output voltage of an H-bridge monophasic DC/AC stage of the preceding figure, functioning according to the previously expounded method of the state of the art, for a bus voltage reference of 350 V and grid voltage of 230 V.

Based on the foregoing, state-of-the-art converters allow THD current values very inferior to the limits established by the different regulations. FIG. 4 shows, by way of example, the evolution of coil current evolution (L/2) and H-bridge monophasic DC/AC stage output voltage, functioning according to the previously expounded method of the state of art, for a reference bus voltage 10% higher than the grid voltage peak value.

If bus voltage is less than $V_{busref,min}$, the modulator becomes saturated, losing control of the current at grid voltage maximums, which will entail an increase in current THD. Due to this, state-of-the-art converters avoid this saturation.

On the other hand, the importance of maximising the energy produced by the facility requires the use of high-efficiency elements. In order to enhance converter efficiency, its losses must be reduced. Electronic converter losses can be grouped into three major groups:
1. Losses associated to power semiconductors. These losses are in turn divided into:
   Conduction losses: proportional to semiconductor saturation current and voltage.
   Switching losses: proportional to the current, the cut-off voltage supported by the semiconductors and switching frequency.
2. Losses in inductive components. These are losses that appear in elements such as coils or the converter output transformer.
3. Losses associated to control electronics. This group encompasses power source losses and control circuitry losses (integrated circuits, resistors, microprocessors, etc.).

The use of more efficient components enhances converter efficiency. However, an efficiency/price compromise that limits converter efficiency must be reached.

The losses associated to semiconductors and coils depend on the conversion topology used. A DC/AC structure commonly used in photovoltaic converters is the H-bridge (FIG. 3) with unipolar PWM modulation, said structure having demonstrated a good efficiency/complexity ratio. However, in order to enhance H-bridge performance, DC/AC conversion topologies with less losses have been developed, such as those disclosed in EP1369985, U.S.2005286281 or W02008015298A1. These topologies enhance the efficiency of the DC/AC structure but increase the complexity of the conversion structure.

DESCRIPTION OF THE INVENTION

The present invention corresponds to a control method applicable to DC/AC conversion structures, particularly applicable to electronic converters for photovoltaic systems and more specifically to conversion structures formed by combining one or several DC/DC stages with one or several DC/AC stages. The proposed control method reduces semiconductor switching losses, enhancing conversion structure efficiency. The invention is also applicable in other fields of energy generation wherein DC/AC conversion structures are used, such as energy generation by means of electrochemical cells or wind energy.

The present invention proposes the implementation of a new control method in the electronic converter formed by at least one DC/AC stage with its respective control loops. Said control method comprises the following phases:

Calculating an input voltage reference value for each DC/AC stage (also called bus voltage) by means of a regulator, in order for each stage to function in the saturation regime for a controlled period of time.

Maintaining the transistors of each DC/AC stage switched off during the saturation time.

In this manner, a new control loop regulates the bus voltage reference value. This loop is in charge of calculating the value of said voltage based on the pre-set harmonic current distortion. By establishing a distortion value greater than that obtained without modulator saturation, this new loop will cause the modulator to become controllably saturated during grid voltage maximums.

Therefore, two efficiency enhancements are obtained:
1. Bus voltage is reduced, with the ensuing drop in switching energies.
2. The transistors of the DC/AC structures are switched off during maximum current times, significantly reducing switching losses.

Modulator saturation produces a deformation in output current and therefore an increase in current THD with respect to the state of the art. The proposed control method controls the THD value, guaranteeing a pre-set value at all times.

The relationship between current THD and modulator saturation time allows calculation of the bus voltage reference value, by means of a regulator that controls the saturation time of each DC/AC stage for a determined period of time. Said period of time may be a multiple or sub-multiple of the grid voltage.

After determining the reference input voltage of each DC/AC stage, a voltage control loop determines the output current amplitude of each DC/AC stage. Subsequently, at least one current control loop of each DC/AC stage determines the reference introduced into the modulator of each DC/AC stage.

The invention envisages the case where there is at least one DC/AC input stage, controlling bus voltage by means of said stage. In this case, a voltage control loop determines current amplitude of the DC/AC stages. Subsequently, at least one current control loop of each DC/DC stage determines the reference that is introduced into the modulator of each DC/AC stage.

The aforementioned DC/AC stages may be of the monophasic or triphasic type. Additionally, they may be of the multi-level type.

The invention is also applicable in other fields of energy generation, such as energy generation by means of electrochemical cells or wind energy In order to complete this description and with the object of better understanding the characteristics of the invention, a set of drawings is included as an integral part of said description, wherein the following is represented in an illustrative and non-limiting manner:

DESCRIPTION OF ONE OR SEVERAL EXAMPLES OF EMBODIMENT OF THE INVENTION

As previously described, examples of the state of the art are shown in FIGS. 1, 2, 3 and 4.

Figure 5:
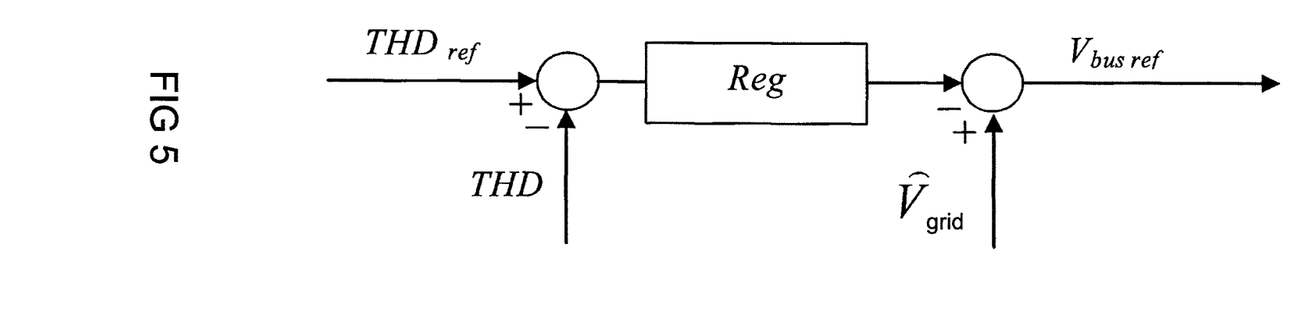
FIG. 5 shows a preferred embodiment of the proposed invention.

FIG. 5 shows a preferred embodiment of the proposed control method. Here, the bus voltage reference value ($V_{bus\ ref}$) is calculated based on the current THD error and grid voltage value. To this end:

THD error is calculated based on a reference THD value ($THD_{ref}$) and measured current THD (THD).

Said THD error is introduced into the regulator (Reg).

The regulator output value (Reg) is subtracted from the grid voltage peak value ($\hat{V}_{grid}$), thereby obtaining the reference bus voltage ($V_{bus\ ref}$).

Figure 6:
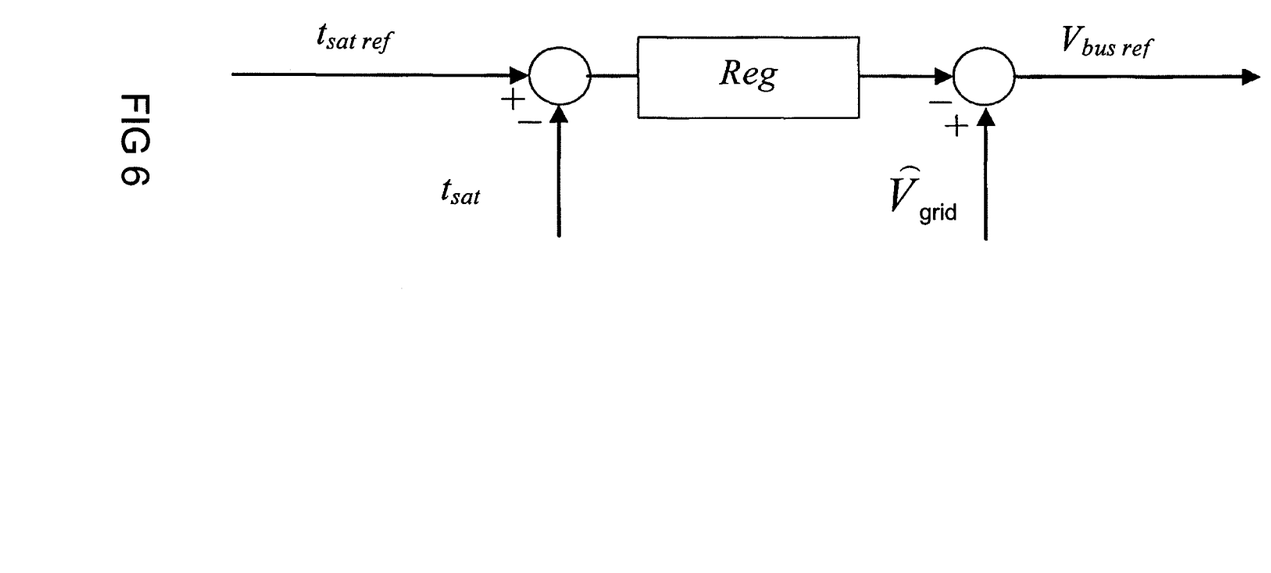
FIG. 6 shows a second preferred embodiment of the proposed invention.

FIG. 6 shows a second preferred embodiment of the proposed control method, based on the relationship between current THD and modulator saturation time. In this case, the bus voltage reference value ($V_{bus\ ref}$) is obtained from a regulator (Reg) that controls modulator saturation time by grid period, taking the error in saturation times and grid voltage value ($V_{bus\ ref}$), into account. To this end:

The modulator saturation time error is calculated based on a reference value ($t_{sat\ ref}$) and the measured saturation time ($t_{sat}$).

Said saturation time error is introduced into the regulator (Reg).

The regulator output value (Reg) is subtracted from the grid voltage peak value ($\hat{V}_{grid}$), thereby obtaining the reference bus voltage ($V_{bus\ ref}$).

Figure 7:
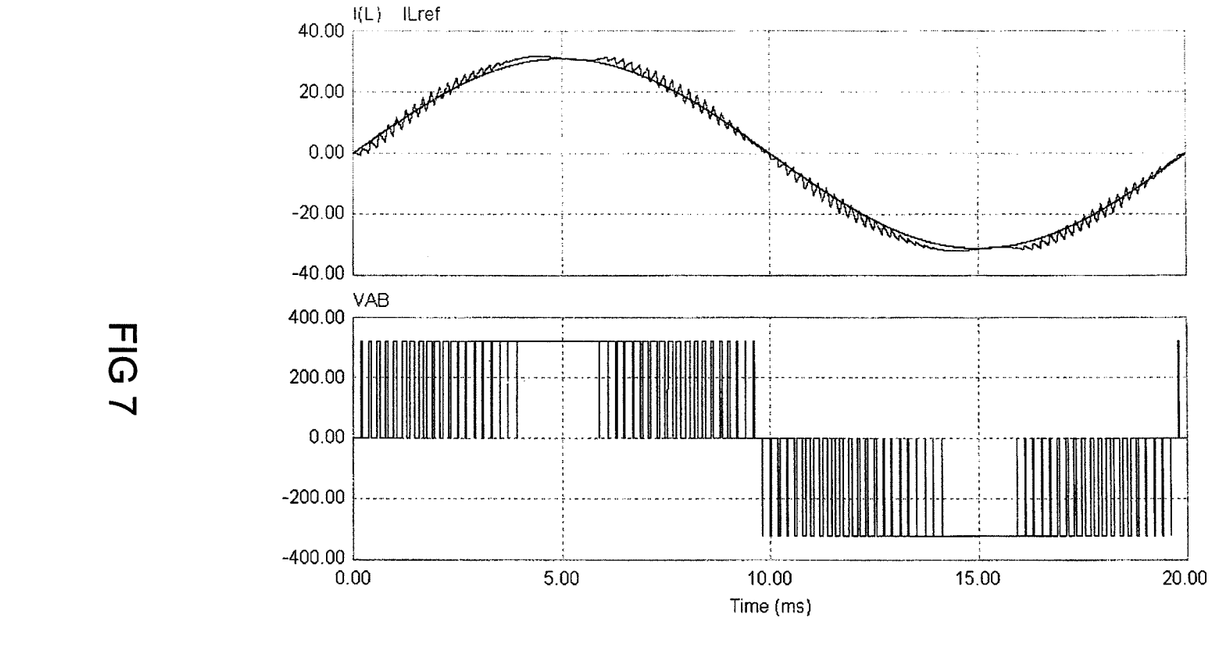
FIG. 7 shows, by way of example, the evolution of the coil current and output voltage of an H-bridge monophasic DC/AC stage with unipolar PWM modulation after applying the proposed control method.

FIG. 7 shows, by way of example, the evolution of the coil (L) current I (L) and output voltage (VAB) of an H-bridge monophasic DC/AC stage with unipolar PWM modulation after applying the proposed control method. The proposed control method enhances converter efficiency by reducing bus voltage and suppressing switching.

In a preferred embodiment of the invention, a bus voltage control loop that determines the amplitude of each output current of each DC/AC stage is incorporated.

Another preferred embodiment is characterised by incorporating at least one current control loop that determines each reference introduced into the modulator.

The invention claimed is:

1. Method for controlling a conversion structure for converting direct current to alternating current formed by at least one DC/AC stage with its respective control loops and modulator, comprising:
   calculating the input voltage reference value of each DC/AC stage by means of a regulator, in order for each DC/AC stage to function in a saturated manner for a controlled period of time; and
   maintaining the transistors of each DC/AC stage switched off during the saturation period.

2. Method for controlling a conversion structure for converting direct current to alternating current, according to claim 1, wherein the input voltage reference value of each DC/AC stage is obtained by means of a regulator that controls total harmonic distortion (THD) of the output current of each DC/AC stage.

3. Method for controlling a conversion structure for converting direct current to alternating current, according to claim 1, wherein the input voltage reference value of each DC/AC stage is obtained by means of a regulator that controls the saturation time of each DC/AC stage for a determined period of time.

4. Method for controlling a conversion structure for converting direct current to alternating current, according to claim 3, wherein the period of time is selected between a multiple and sub-multiple of the grid voltage period.

5. Method for controlling a conversion structure for converting direct current to alternating current, according to claim 1, comprising determining the output current amplitude of each DC/AC stage by means of an input voltage control loop of each DC/AC stage.

6. Method for controlling a conversion structure for converting direct current to alternating current, according to claim 2, comprising determining the output current amplitude of each DC/AC stage by means of an input voltage control loop of each DC/AC stage.

7. Method for controlling a conversion structure for converting direct current to alternating current, according to claim 3, comprising determining the output current amplitude of each DC/AC stage by means of an input voltage control loop of each DC/AC stage.

8. Method for controlling a conversion structure for converting direct current to alternating current, according to claim 4, comprising determining the output current amplitude of each DC/AC stage by means of an input voltage control loop of each DC/AC stage.

9. Method for controlling a conversion structure for converting direct current to alternating current, according to claim 5, comprising determining the reference introduced into the modulator of each DC/AC stage by means of at least one current control loop of each DC/AC stage.

10. Method for controlling a conversion structure for converting direct current to alternating current, according to claim 6, comprising determining the reference introduced into the modulator of each DC/AC stage by means of at least one current control loop of each DC/AC stage.

11. Method for controlling a conversion structure for converting direct current to alternating current, according to claim 7, comprising determining the reference introduced into the modulator of each DC/AC stage by means of at least one current control loop of each DC/AC stage.

12. Method for controlling a conversion structure for converting direct current to alternating current, according to claim 8, comprising determining the reference introduced into the modulator of each DC/AC stage by means of at least one current control loop of each DC/AC stage.

13. Method for controlling a conversion structure for converting direct current to alternating current, according to claim 1, wherein it incorporates at least one DC/DC input stage.

14. Method for controlling a conversion structure for converting direct current to alternating current, according to claim 13, comprising determining the current amplitude of each DC/DC stage by means of a voltage control loop of each DC/AC stage.

15. Method for controlling a conversion structure for converting direct current to alternating current, according to claim 14, comprising determining the reference that is introduced into the modulator of each DC/DC stage by means of a current control loop.

16. Method for controlling a conversion structure for converting direct current to alternating current, according to claim 1, wherein the DC/AC stages are monophasic.

17. Method for controlling a conversion structure for converting direct current to alternating current, according to claim 1, wherein the DC/AC stages are triphasic.

18. Method for controlling a conversion structure for converting direct current to alternating current, according to claim 1, wherein the DC/AC stages are multi-level.

19. Method for controlling a conversion structure for converting direct current to alternating current, according to claim 1, wherein it is specially designed for use in photovoltaic facilities.

* * * * *